(12) United States Patent
Stubbs et al.

(10) Patent No.: US 9,987,748 B2
(45) Date of Patent: Jun. 5, 2018

(54) NETWORKED ROBOTIC MANIPULATORS

(71) Applicant: Amazon Technologies, Inc., Seattle, WA (US)

(72) Inventors: Andrew Stubbs, Waltham, MA (US); Diane Grieselhuber Mills, Wilmington, MA (US); John Gregory Longtine, Sudbury, MA (US); Matthew David Verminski, North Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days. days.

(21) Appl. No.: 15/632,140

(22) Filed: Jun. 23, 2017

(65) Prior Publication Data

US 2017/0297200 A1    Oct. 19, 2017

Related U.S. Application Data

(63) Continuation of application No. 14/860,584, filed on Sep. 21, 2015, now Pat. No. 9,718,188.

(51) Int. Cl.
*G06F 7/00* (2006.01)
*G06F 19/00* (2018.01)
*B25J 9/16* (2006.01)
*G05B 19/418* (2006.01)
*G06Q 10/08* (2012.01)

(52) U.S. Cl.
CPC .............. *B25J 9/1679* (2013.01); *B25J 9/163* (2013.01); *B25J 9/1682* (2013.01); *G05B 19/418* (2013.01); *G06Q 10/087* (2013.01); *G05B 2219/39106* (2013.01); *G05B 2219/39107* (2013.01); *G05B 2219/40053* (2013.01); *Y10S 901/02* (2013.01); *Y10S 901/46* (2013.01)

(58) Field of Classification Search
None
See application file for complete search history.

(56) References Cited

U.S. PATENT DOCUMENTS

| | | |
|---|---|---|
| 8,386,078 B1 | 2/2013 | Hickman et al. |
| 2008/0243305 A1 | 10/2008 | Lee et al. |
| 2012/0165979 A1 | 6/2012 | Lim et al. |
| 2015/0032252 A1 | 1/2015 | Galluzzo et al. |
| 2015/0057793 A1* | 2/2015 | Kawano ............... G06Q 10/087 700/216 |

(Continued)

OTHER PUBLICATIONS

U.S. Appl. No. 14/860,584, "Non-Final Office Action", dated Dec. 15, 2016, 11 pages.

(Continued)

*Primary Examiner* — Yolanda R Cumbess
(74) *Attorney, Agent, or Firm* — Kilpatrick Townsend & Stockton LLP

(57) ABSTRACT

Robotic manipulators may be used to manipulate objects. Manipulation data about manipulations performed on objects may be generated and accessed. This data may be analyzed to generate a profile indicating how an object may be manipulated. A portion of the profile may be transmitted to a particular robotic manipulator. For example, the portion may be based on a manipulation capability of the robotic manipulator. In turn, the robotic manipulator may use the portion of the profile to manipulate the object.

18 Claims, 10 Drawing Sheets

(56) References Cited

U.S. PATENT DOCUMENTS

2015/0343635 A1* 12/2015 Linnell .................. B25J 9/1671
700/249
2017/0080566 A1 3/2017 Stubbs et al.

OTHER PUBLICATIONS

U.S. Appl. No. 14/860,584 , "Notice of Allowance", dated Mar. 31, 2017, 6 pages.
PCT/US2016/052630 , "International Search Report and Written Opinion", dated Dec. 23, 2016, 17 pages.
PCT/US2016/052630, Written Opinion of the International Preliminary Examining Authority, dated Sep. 7, 2017, 14 pages.

* cited by examiner

NETWORKED ROBOTIC MANIPULATORS

CROSS-REFERENCE TO RELATED APPLICATIONS

This application is a continuation of U.S. patent application Ser. No. 14/860,584, filed Sep. 21, 2015, and entitled "NETWORKED ROBOTIC MANIPULATORS." The disclosure of which is incorporated herein by reference.

BACKGROUND

Robot stations of a system may automate and autonomously provide different functionalities for the system. For example, inventory systems may use a fleet of different types of robot stations. Some of the robot stations may be tasked to pack-in items received from a source. Other robot stations may be tasked to pack-out items for delivery to a destination. The efficiencies of the robot stations in performing the respective tasks may impact the overall efficiency of the inventory system. The more efficient the robot stations, the higher the throughput, the shorter the response time, and/or the better the resource usage of the inventory system may be.

Generally, a robot station of a system may be programmed to perform a task in a specific way. Another robot station of the same system may perform the same or a related task. In certain situations, a change may be introduced to how the task may be performed to improve the efficiency of the robot station. However, the change may not be easily or efficiently propagated, if at all, to the other robot station. Thus, an opportunity to further improve the overall efficiency of the system may not be fully exploited.

BRIEF DESCRIPTION OF THE DRAWINGS

Various embodiments in accordance with the present disclosure will be described with reference to the drawings, in which.

DETAILED DESCRIPTION

Figure 1:
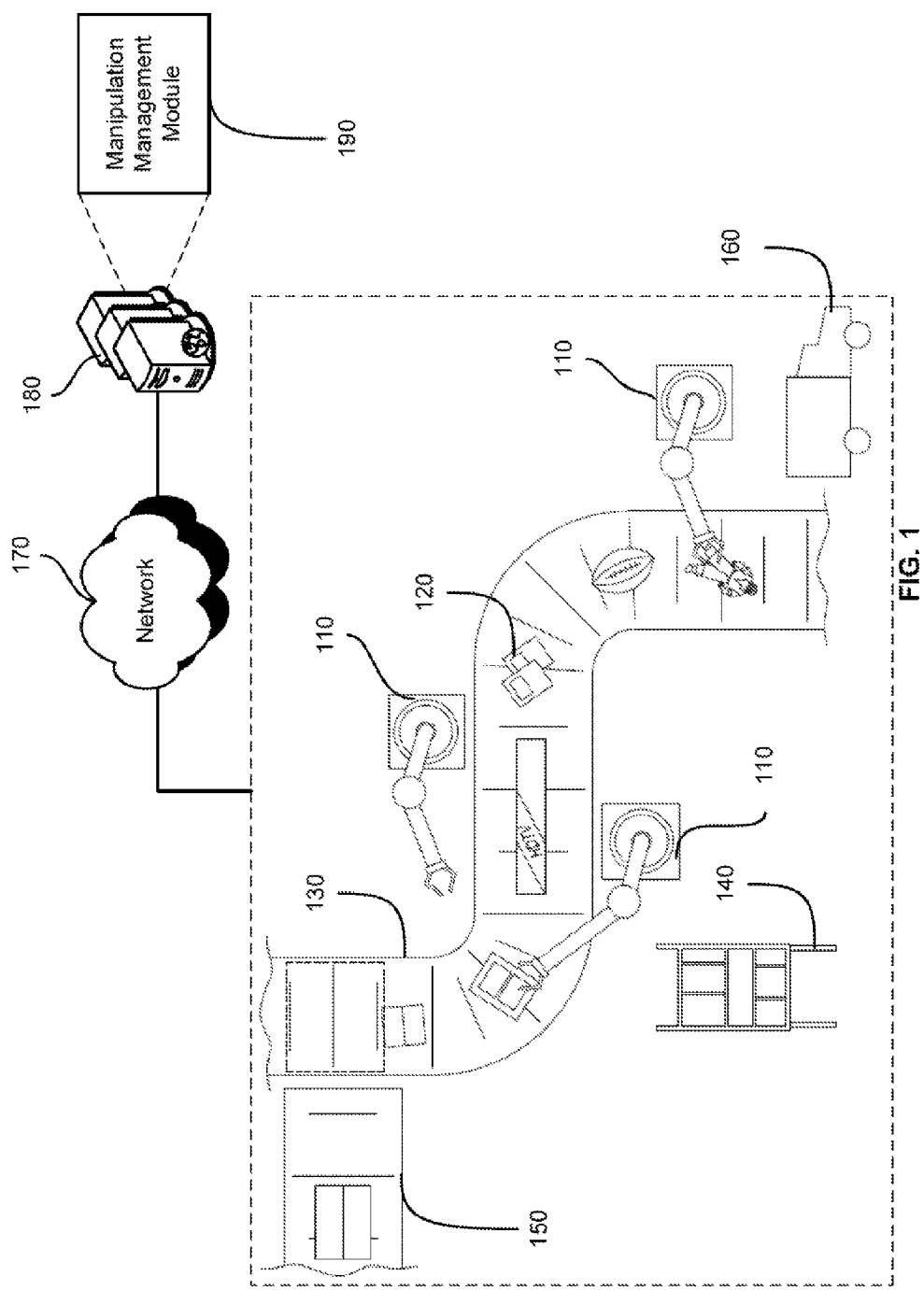
FIG. 1 illustrates an example of an inventory system including robot stations and a central station, according to a particular embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to a system that may use multiple robot stations. In particular, the robot stations may be configured to perform various tasks, some of which may relate to manipulating objects. A source external to a robot station may provide an object to the robot station. The robot station may perform a task by manipulating the object. Another robot station may likewise receive and further manipulate the object. This other robot station may perform the same, similar, or a different task. Regardless, knowledge about the manipulations may be shared between the two robot stations. For example, the two robot stations may be connected to a central station over a network. The central station may collect, from the robot stations, data about how the item may have been manipulated and the results of the manipulation. Based on this data, the central station may generate a profile describing how to manipulate the object. The profile, or applicable portions thereof, may be transmitted to and used by the robot stations in subsequent manipulations. Over time, the central station may identify changes to the manipulations by collecting and analyzing manipulation data from the robot stations. The profile may be accordingly updated and the updates may be transmitted to the robot stations. As such, collective knowledge about how to manipulate the object may be developed and propagated between the robot stations. In this way, lessons learned from one robot station may be propagated to other robot stations. Thereby, the efficiencies of the robot stations and/or the overall efficiency of the system may be improved.

To illustrate, consider an example of an inventory system using a central station, a set of pack-in robot stations, and a set of pack-out robot stations interconnected via a data network. A pack-in robot station may be configured to receive, pack, and store an item in an inventory holder. A pack-out robot station may be configured to retrieve the item from the inventory holder and prepare the item for delivery. As such, both robot stations may grasp the item, along with performing other manipulations. The pack-in robot station may include optical sensors to detect a surface of the item, and an end effector to apply a particular grasping mechanism. By using the image sensors and the end effector, the pack-in robot station may attempt different grasping mechanisms by, for example, rotating the item in different directions, imaging the item, and applying different grasping forces. As a result, the pack-in robot station may learn that the item may have a flat surface and that applying a suction force to the flat surface may provide the desired grasping. Data about the flat surface and suction force may be transmitted to the central station. In turn, the central station may generate a profile for manipulating the item. The profile may identify the flat surface and specify the suction force. The central station may transmit the profile to the other pack-in robot stations and to the pack-out robot stations. Any or all of these other robot stations may use the profile to grasp the item. Accordingly, knowledge derived from the pack-in robot station may be propagated to the other robot stations of the inventory system. In turn, these robot stations need not develop their own grasping mechanisms, which may free up the robot stations to perform other tasks. Thereby, the overall throughput, resource usage, and response time of the inventory system may be improved.

In the interest of clarity of explanation, embodiments may be described herein in connection with an inventory system, inventory items (e.g., items associated with an inventory), and manipulations related to an inventory. However, the embodiments are not limited as such. Instead, the embodiments may similarly apply to any objects, whether inventoried or not, and to any system, whether related to inventorying objects or not. For example, the embodiments may similarly apply to a manufacturing system, supply chain distribution center, airport luggage system, or other systems using robot stations to perform various automated and, in some instances, autonomous operations.

Turning to FIG. 1, the figure illustrates an example inventory system configured to implement the above described techniques. In particular, the example inventory system may include multiple robot stations 110 in communication with a central station 180 over a network 170. The central station 180 may collect, from the robot stations 110, data about how items 120 may be manipulated and may to generate a collective knowledge about manipulations and propagate that knowledge to the robot stations 110.

Although FIG. 1 illustrates three robot stations 110, a smaller or larger number of robot stations (e.g., in the hundreds or even thousands) may exist within the inventory management system. Some of the robot stations 110 may be stationary at specific locations. Yet some other of robot stations 110 may be mobile and may move between locations. The robot stations 110 may be configured to perform different tasks related to inventorying the items 120. These tasks may include manipulating the items 120. To manipulate an item, a robot station may include an appropriate robotic manipulator, such as one including a robotic arm and/or an end effector for the desired manipulation. A manipulation of an item may represent a set of actions applied to the item in association with an inventory task. For example, an item may be received from a source 150 external to the inventory system, such as from a manufacturing facility or a distribution facility. The item may arrive to the inventory system and may be delivered to a robot station by way of a conveyor belt 130, or some other delivery mechanism. The robot station may pack-in the item by, for example, grasping, moving, and releasing the item into a container. The container may be located in an inventory holder 140. Additionally or alternatively, the robot station or another robot station may grasp and move the container to the inventory holder 140. Grasping, moving, and releasing the item may represent examples of manipulations applied to the item. Similarly, grasping and moving the container may represent examples of manipulations applied to the container. Conversely, the same or a different robot station may pack out the item from inventory holder 140 in preparation for a delivery of the item to a destination. The respective robot station may retrieve the container, grasp and move the item from the container, package the item, and place the package on the conveyor belt 130. Retrieving, packaging, and placing may represent other examples of manipulations. Once on the conveyor belt 130 again, the package may be moved to a delivery vehicle 160.

Some or all of the tasks of the robot stations 110 may be managed by the central station 180. In an example, the central station 180 may represent a computer system configured to provide different inventory management functionalities. The computing system may include a physical computing resource, such as a computer server. Additionally or alternatively, the computer system may include a virtual computing resource (e.g., a computing cloud-based resource). Although FIG. 1 illustrates the central station 180 as a component separate from the robot stations 110, the central station 180 or functionalities thereof, may be integrated with a set of robot stations 110 or distributed among the robot stations 110. Further and although FIG. 1 illustrates that the central station 180 supports a single inventory system, the central station 180 may support a larger number of inventory systems. Conversely, a single inventory system may subscribe to and be supported from multiple central stations.

Regardless of the underlying structure of the computer system, the central station 180 may host a manipulation management module 190. The manipulation management module 190 may be configured to collect manipulation data from the robot stations 110, generate manipulation profiles based on the manipulation data, transmit the manipulation profiles to the robot stations 110 as applicable, update the manipulation profiles over time based on additional manipulation data, and transmit the updates to the robot stations 110 as applicable. In turn, each or some of the robot stations 110 may receive and use the applicable manipulation profiles to manipulate the items 120.

The manipulation data may represent data associated with how an item may have been manipulated. For example, the data may describe the item (e.g., include two or higher dimensional images of the item, a two or higher dimensional model of the item, etc.), attributes of the item (e.g., dimensions, weights, center of gravity, etc.), or features associated with surfaces of the item (e.g., a label added to a surface, a handle on one surface, surface characteristics, material characteristics, packaging, etc.). The data may also describe the applied manipulations (e.g., a list of the actions including grasping, moving, retrieving, etc.), related manipulation parameters (e.g., type and amount of force, pressure, voltage, and/or current applied, orientation of an item, etc.), and successes and failures of the applied manipulations (e.g., whether grasping an item was successful, whether scooping the item was unsuccessful, damages resulting from using particular manipulations, end effectors, or forces, etc.). The data may also describe attributes of the robot stations 110 such as what robotic arms and end effectors may have been used, amount of applied force, etc.

A manipulation profile may represent a profile or a collection of data describing how an item may be manipulated. In an example, the manipulation profile may identify the item or a type of the item and may include instructions about manipulations applicable to the item. For instance, the instructions may specify a certain orientation and position of the item, a surface for applying a force, the type and amount of the force, what end effector to use, what robotic arm to use, type and amount of movement to use, and/or other manipulation-related instructions.

The manipulation data and the manipulation profiles may be exchanged over the network 170. The network 170 may include a public data network (e.g., the Internet) or a private data network (e.g., an intranet or a virtual private network (VPN)), wireless or wired, and implementing different communication protocols (e.g., TCP/IP). In an example, the network 170 may not only connect the central station 180 and the robot stations 110, but may also interconnect the robot stations 110 themselves. As such, the robot stations 110 may be able to exchange manipulation data and manipulation profiles among themselves. This may be the case when, for instance, functionalities of the central station 180 (e.g., of the manipulation management module 190) may be distributed between some or all of the robot stations 110.

Hence, the robot stations 110 and the central station 180 may be networked by way of the network 170. Knowledge about manipulating the items 120 may be generated, propagated, and updated over time. As such, a robot station may exploit knowledge generated based on manipulation data of other robot stations.

Figure 2:
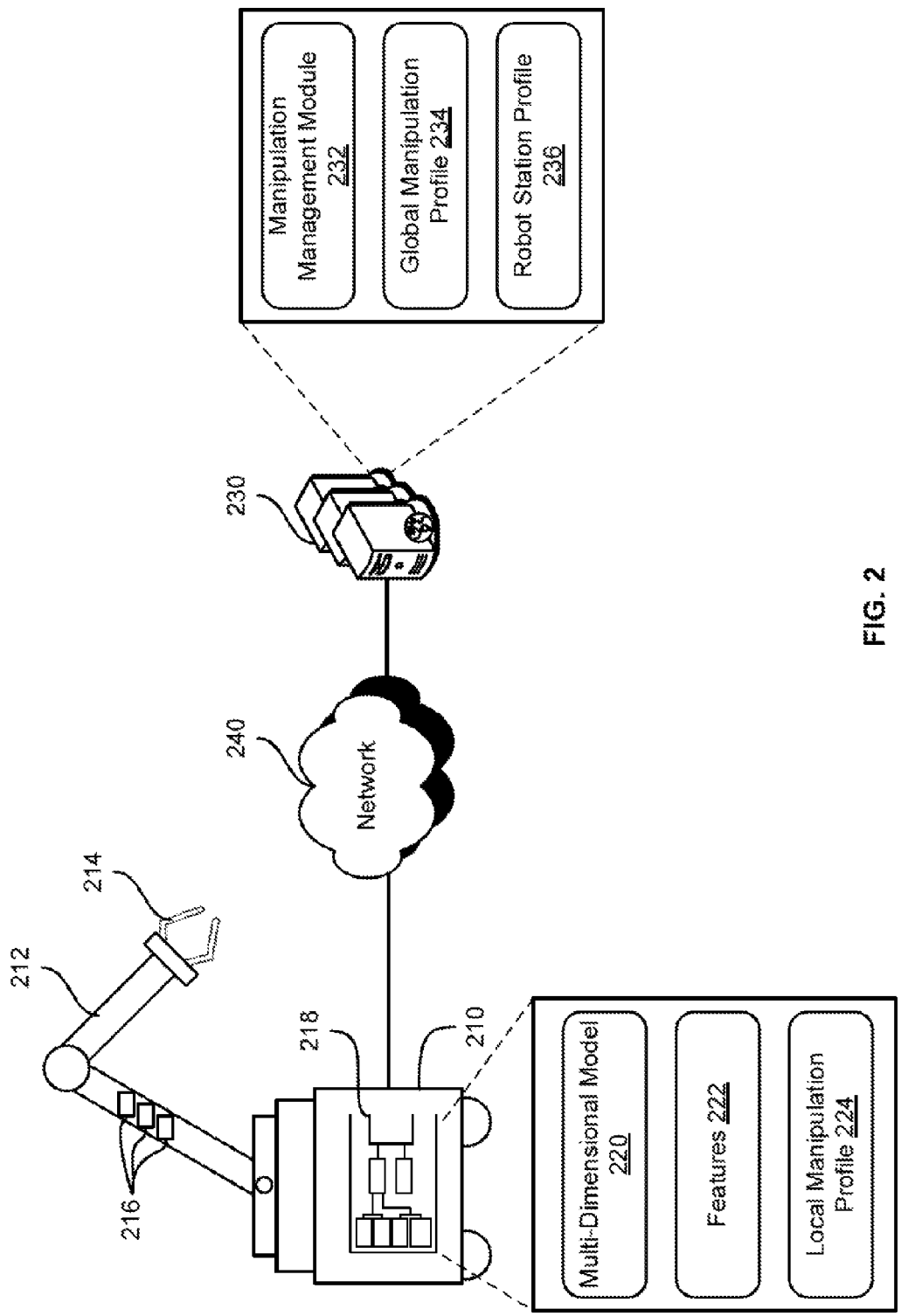
FIG. 2 illustrates example components of a robot station and a central station, according to a particular embodiment.

The robot stations 110 of FIG. 1 may be examples of a robotic manipulator. Generally, a robotic manipulator may represent a robotic system that may manipulate an item (or an object). FIG. 2 further illustrates components of a robot station 210 as an example of a robotic manipulator. Similarly to the robot stations 110 of FIG. 1, the robot station 210 may be in communication with a central station 230 over a network 240.

The robot station 210 may include a robotic arm 212 and an end effector 214. Although the description herein primarily refers to a robotic arm 212, any other mechatronic or robotic device may be used in lieu of or in addition to a robotic arm. The end effector 214 may be connected to an end of the robotic arm 212 and configured to manipulate an item. Any suitable end effector (or number or combination of end effectors) may be utilized, including, but not limited to, soft robotic effectors, vacuum effectors, electro-adhesion effectors, and mechanical or electromechanical effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electro-active polymers (e.g., polymers which change size or shape when stimulated by an electric field), or ferrofluids (e.g., fluids having suspended ferromagnetic particles capable of altering a size or shape of the fluid volume when subjected to a magnetic field). Vacuum end effectors may manipulate items using suction. Electroadhesion end effectors can include an array of electrodes arranged along a flexible or rigid substrate capable of applying a charge (akin to static electricity) that can adhere an item to the substrate portions that are in contact with the item. Mechanical or electromechanical end effectors may include pinchers, claws, grippers, or other rigid components that may be actuated relative to one another for manipulating an item. Other end effectors may also be utilized to facilitate additional manipulation techniques, such as trays, scoops or other similar structures. For example, a magnetic or electromagnetic end effector may be useful for manipulating items having ferro-magnetic materials.

In an example, the robot station 210 may also include a set of sensors 216. The sensors 216 may be installed at different points of the robot station 210 including, for instance, at the robotic arm 212 and/or the end effector 214. The sensors 216 may be configured to sense parameters associated with an item manipulation. These parameters may be processed by a computer system 218 of the robot station 210 to generate manipulation data and control operations of the robotic arm 212 and/or end effector 214.

Generally, the sensors 216 may include different types of sensors to determine attributes of an item to be manipulated. For example, imaging devices or optical sensors may be used to determine physical characteristics, such as size, shape, position, orientation, and/or surface characteristics (e.g., how porous and/or slippery the item is based on the surface appearance). Any suitable optical technology can be utilized, including, but not limited to, two-dimensional cameras, depth sensors, time of flight sensing (e.g., broadcasting a source of light and determining a time of reflection for each pixel to determine a distance from the sensor for each pixel to determine a three-dimensional array of data points representing a virtual model of the sensed item and environment), structured light sensing (e.g., projecting a known image from a light source, observing the image as distorted by variations in the surface of the detected item, and analyzing the distortions with respect to the projected image to determine positioning of the features that caused the distortion), stereo sensing (e.g., analyzing differences in images collected from multiple cameras arranged at known offsets from one another to generate a point cloud or digital model), active stereo sensing (e.g., projecting a pattern of light to improve precision of detection of features while using stereo sensing), any other optically-based methodology of observing light for generating a digital representation of a physical object, or any combination thereof.

Additionally or alternatively, other sensors may be used for other sensing data (e.g., force sensing, tactile sensing, pressure sensing, voltage sensing, conductance sensing, ultrasonic sensing, x-ray sensing, or other sensing), such as to determine physical attributes of a detected item to be grasped or its surroundings, such as structural integrity, deformability, weight, surface characteristics (e.g., how slippery the item may be), or other physical attributes of a detected item.

In an example, the sensors 216 may include imaging or optical sensors capable of taking images of an item. The optical sensors may form a two or higher dimensional imaging device (e.g., a camera) and may provide color, grayscale, or black and white images at different resolutions. The computer system 218 may implement various image processing techniques to generate a multi-dimensional model 220 of the item (e.g., a two, two and half, and/or three dimensional model). The computer system 218 may use the multi-dimensional model 220 to position and/or orient an item, identify surfaces and features of the item, and accordingly activate the robotic arm 212 and end effector 214 to manipulate the item.

The sensors 216 may also include grasp and position sensors. The computer system 218 may use these sensors to also generate or update the multi-dimensional model 220. For example, the computer system 218 may use the sensors to move the end effector 214 along the edges and surfaces of an item and to accordingly map these edges and surfaces. The computer system 218 may also use the sensors to control different grasps and positions of the grasps applied to the item and the resulting successes or failures in manipulating the item. Accordingly, the computer system 218 may also add data about the grasps and positions to the multi-dimensional model 220.

Other types of sensors may also be used. For example, suitable sensors may be installed at the robot station 210 and used by the computer system 218 to measure a weight, volume, center of gravity, and/or other structural characteristics (how rigid, flexible, bendable, etc.) of an item. These sensors may include, for instance, pressure, position, force, weight, touch, and/or other sensors. Such information may be added to the multi-dimensional model 220.

In an example, the sensors 216 may be configured for two dimensional imaging. Typically, two dimensional imaging may be cheaper (component cost and computational resource cost) to use relatively to higher dimensional images. In such situations, a two and half or higher dimensional model 220 may nonetheless be used. To do so, the computer system 220 may map two dimensional images to the multi-dimensional model 220. The map may rely on features 222 of the item. In other words, the multi-dimensional model 220 may identify features on surfaces of the item, the relative distances, positions, and orientations of the features. Thus, a two dimensional image of the item showing a feature may allow an identification of a respective surface. If the two dimensional image (or a plurality thereof) shows multiple features, relative distances, positions, and orientations of these features may be determined. As such, rather than using higher dimensional and more expensive imaging devices, the robot station 210 may include a two dimensional imaging device. Generated two dimensional images of an item may be mapped to the multi-dimensional model 220 allowing the computer system 218 to determine the relative positon and orientation of the item in three dimensional space.

In this example, the computer system 218 may maintain a list of features 222 that may be used to map two dimensional images to the multi-dimensional model 220. The computer system 218 may identify the features 222 by applying different image recognition techniques (e.g., pattern recognition, edge detection, etc.) to the two dimensional images. The computer system 218 may map the two dimensional images to the multi-dimensional model 220 by matching features between the images and the model. In addition, the computer system 218 may categorize the features 222 between reliable and unreliable features. Reliable features may represent features that, when identified, may accurately and/or consistently (e.g., with a success rate over a particular threshold, such as ninety percent) allow the mapping. For example, a label (or some other example feature) centered on a surface of a rectangular box with colors distinctly different from the color of the surface of the rectangular box may be reliable for mapping a two dimensional image of the surface to a three dimensional model of the rectangular box.

In an example, the multi-dimensional model 220 and/or features 222 may be available from and generated by a source external to the robot station 210, such as from the central station 230, from another robot station, or from an entity external to the associated inventory system (e.g., from a computer system of an item manufacturer). In this example, the robot station 210 need not but may include the set of sensors 216. If included, the robot station 210 need not but may use the set of sensors to confirm and/or update the multi-dimensional model 220 and/or features 222.

In an addition, the computer system 218 may receive and store a local manipulation profile 224 from the central station 230. The local manipulation profile 224 may represent a manipulation profile customized to the robot station 210. The customization may be based on manipulation capabilities (e.g., what robotic arms and end effectors are installed at the robot station 210), usages of the robot station 210 (e.g., what tasks the robot station 210 may perform), and/or the items that the robot station 210 may manipulate. In an example, the local manipulation profile 224 may include multi-dimensional model 220 and the features 222. In another example, the local manipulation profile 224 may specify how the multi-dimensional model 220 and the features 222 may be used to manipulate an item. The computer system 218 may access and use the local manipulation profile 224 to control the robotic arm 212, the end effector 214, and/or the sensors 216 in order to manipulate the item according to the local manipulation profile 224.

The robot station 210 and the central station 230 may exchange manipulation and profile data over the network 240. In an example, the central station may collect manipulation data from the robot station 210 over the network 240 and from other robot stations over the same or different network. The manipulation data may include, for example, data from or the actual multi-dimensional model 220 and the list of features 222.

The central station 230 may host a manipulation management module 232. The manipulation management module 232 may be configured to analyze the collected manipulation data and, accordingly, generate a global manipulation profile 234. For example, the manipulation management module 232 may implement machine learning algorithms to analyze the manipulation data and generate the global manipulation profile 234. The global manipulation profile 234 may represent a manipulation profile applicable to a plurality of robot stations. For example, the global manipulation profile 234 may list how an item may be manipulated and a needed capability of a robot station to perform the manipulation.

In addition, the central station 230 may maintain a profile 236 of the robot station 210. This robot station profile 236 may identify the manipulation capabilities and the usages of the robot station 210, and the items that the robot station 210 may be expected to manipulate. The manipulation management module 232 may use the robot station profile 236 to generate the local manipulation profile 224 from the global manipulation profile 234. For example, the manipulation management module 232 may customize the global manipulation profile 234 by matching the manipulation instructions and/or the needed capability from the global manipulation profile 234 to the manipulation capabilities and usages of the robot station 210 and/or to the items that the robot station 210 may be expected to manipulate.

Although FIG. 2 illustrates a single robot station connected to a central station over a network, there may be a much larger number of robot stations within an inventory system. As such, the data exchange and the data processing may be large. In certain situations, a tradeoff may be considered to balance between the data exchange and the data processing.

In an example, there may be sufficient network bandwidth to exchange a large amount of data. To minimize cost (e.g., component cost and computational cost), much of the data processing may be pushed to the central station 230. In this example, the robot station 210 may not process manipulation data to generate the multi-dimensional model 220, the features 222, and/or the local manipulation profile 224. Instead, the robot station 210 may provide the manipulation data to the central station and, in response, receive the multi-dimensional model 220, the features 222, and/or the local manipulation profile 224. For instance, rather than processing three dimensional data to generate a three dimensional model or two dimensional images to identify features, the robot station 210 may transmit such data to the central station 230.

In another example, network bandwidth usage and processing of the central station 230 may be reduced. For instance, instead of transmitting manipulation data every time that data is generated, the robot station may process a statistically sufficient amount of that data and transmit a summary to the central station. To illustrate, the robot station 210 may determine whether a feature is reliable by attempting to use the feature for a statistically sufficient number of times. Thereafter, the robot station 210 may identify the feature to the central station 230 and indicate the associated reliability.

In another example, network bandwidth usage and/or processing of the central station 230 may be even further reduced or minimized. In this example, the robot station may generate and, once generated, may transmit the multi-dimensional model 220, the features 222, and/or the local manipulation profile 224. Over time, updates to any of the multi-dimensional model 220, the features 222, and the local manipulation profile 224 may be exchanged over the network 240.

Additional network bandwidth and processing efficiencies may be achieved by generating the multi-dimensional model 220, the features 222, the local manipulation profile 224, and/or the global manipulation profile 234 for an item type rather than for a specific item. An item type may represent a type of items, where the items may share a common attribute. Generally, the attribute may be associated with how the items may be manipulated given the attribute. For example, the common attribute may indicate that a common manipulation may be applied to the items given the common attribute. The attribute may be a physical attribute, such as size, shape, weight, volume, structure, fragility, etc. As such, the item type may represent a type of items that may be fully or partially manipulated in a same or similar manner (e.g., based on the number of common manipulations). For example, books of different sizes may belong to one broad item type. However, soft cover books and hard cover books may belong to two different item types.

In an example, the robot station 210 may represent a "scout" robot station. In particular, the robot station 210 may be configured, as described herein above, to generate and transmit the multi-dimensional model 220, the features 222, and the local manipulation profile 224 to the central station. In this example, the robot station 210 may perform much of the upfront processing associated with determining how an item (or item type) may be manipulated. Configurations of remaining robot stations may be simplified. Such robot stations need not be capable of generating multi-dimensional models, features, or the local manipulation profiles. Thus, the number of sensors and the processing capabilities of the computer system of the robot stations may be smaller relative to the robot station 210. Instead, these robot stations would receive the applicable data from the robot station 210 and/or the central station 230, which in turn may rely on data from the robot station 210.

Figure 3:
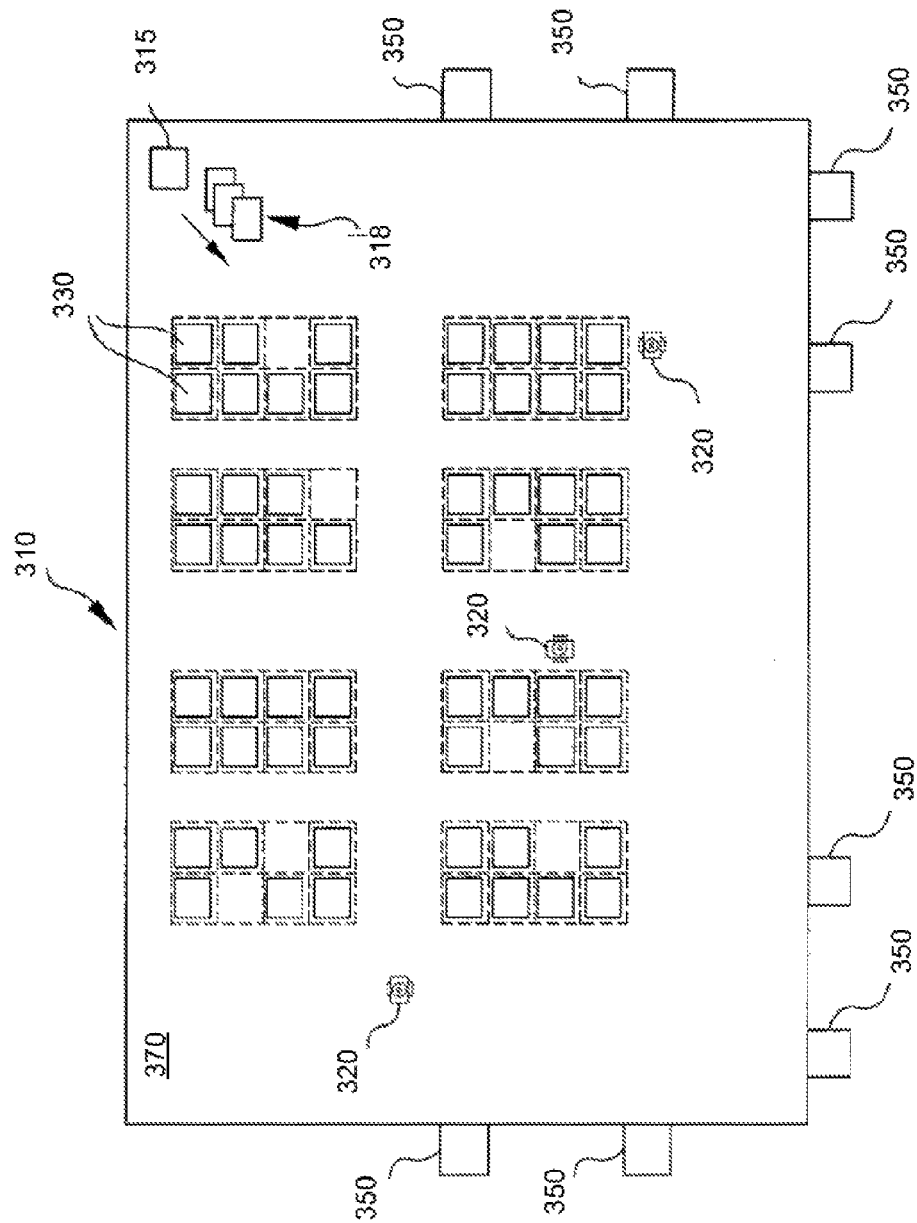
FIG. 3 illustrates example components of an inventory system according to particular embodiments.

FIG. 3 illustrates the contents of an inventory system 310 according to some embodiments of the present disclosure. Inventory system 310 may include a central station 315, one or more mobile drive units 320, one or more inventory holders 330, and one or more inventory stations 350. Mobile drive units 320 may transport inventory holders 330 between points within a workspace 370 in response to commands communicated by central station 315. Each inventory holder 330 may store one or more types of inventory items. As a result, the inventory system 310 may be capable of moving inventory items between locations within the workspace 370 to facilitate the entry, processing, and/or removal of inventory items from the inventory system 310 and the completion of other tasks involving inventory items.

The central station 315 may assign tasks to appropriate components of the inventory system 310 and coordinates operation of the various components in completing the tasks. These tasks may relate not only to the movement and processing of inventory items, but also to the management and maintenance of the components of the inventory system 310. For example, the central station 315 may assign portions of the workspace 370 as parking spaces for the mobile drive units 320, the scheduled recharge or replacement of mobile drive unit batteries, the storage of empty inventory holders 330, or any other operations associated with the functionality supported by inventory system 310 and its various components. The central station 315 may select components of the inventory system 310 to perform these tasks and communicate appropriate commands and/or data to the selected components to facilitate completion of these operations. Although shown in FIG. 3 as a single, discrete component, the central station 315 may represent multiple components and may represent or include portions of the mobile drive units 320 or other elements of the inventory system 310. As a result, any or all of the interaction between a particular mobile drive unit 320 and the central station 315 that is described below may, in particular embodiments, represent peer-to-peer communication between that mobile drive unit 320 and one or more other mobile drive units 320. The contents and operation of an example embodiment of the central station 315 are discussed further below with respect to FIG. 4.

The mobile drive units 320 move the inventory holders 330 between locations within the workspace 370. The mobile drive units 320 may represent any devices or components appropriate for use in the inventory system 310 based on the characteristics and configuration of the inventory holders 330 and/or other elements of the inventory system 310. In a particular embodiment of the inventory system 310, the mobile drive units 320 may represent independent, self-powered devices configured to freely move about the workspace 370. In alternative embodiments, the mobile drive units 320 may represent elements of a tracked inventory system configured to move the inventory holder 330 along tracks, rails, cables, crane system, or other guidance or support elements traversing the workspace 370. In such an embodiment, the mobile drive units 320 may receive power and/or support through a connection to the guidance elements, such as a powered rail. Additionally, in particular embodiments of the inventory system 310, the mobile drive units 320 may be configured to utilize alternative conveyance equipment to move within the workspace 370 and/or between separate portions of the workspace 370.

Additionally, the mobile drive units 320 may be capable of communicating with the central station 315 to receive information identifying the selected inventory holders 330, transmit the locations of the mobile drive units 320, or exchange any other suitable information to be used by the central station 315 or the mobile drive units 320 during operation. The mobile drive units 320 may communicate with the central station 315 wirelessly, using wired connections between the mobile drive units 320 and the central station 315, and/or in any other appropriate manner. As one example, particular embodiments of the mobile drive unit 320 may communicate with the central station 315 and/or with one another using 802.11, Bluetooth, or Infrared Data Association (IrDA) standards, or any other appropriate wireless communication protocol. As another example, in a tracked inventory system 310, tracks or other guidance elements upon which the mobile drive units 320 move may be wired to facilitate communication between the mobile drive units 320 and other components of the inventory system 310. Furthermore, as noted above, the central station 315 may include components of individual mobile drive units 320. Thus, for the purposes of this description and the claims that follow, communication between the central station 315 and a particular mobile drive unit 320 may represent communication between components of a particular mobile drive unit 320. In general, the mobile drive units 320 may be powered, propelled, and controlled in any manner appropriate based on the configuration and characteristics of the inventory system 310.

The inventory holders 330 store inventory items. In a particular embodiment, the inventory holders 330 include multiple storage bins with each storage bin capable of holding one or more types of inventory items. The inventory holders 330 are capable of being carried, rolled, and/or otherwise moved by the mobile drive units 320. In particular embodiments, the inventory holder 330 may provide additional propulsion to supplement that provided by the mobile drive unit 320 when moving the inventory holder 330.

Additionally, in particular embodiments, the inventory items may also hang from hooks or bars (not shown) within or on the inventory holder 330. In general, the inventory holder 330 may store the inventory items in any appropriate manner within the inventory holder 330 and/or on the external surface of the inventory holder 330.

Additionally, each inventory holder 330 may include a plurality of faces, and each bin may be accessible through one or more faces of the inventory holder 330. For example, in a particular embodiment, the inventory holder 330 includes four faces. In such an embodiment, bins located at a corner of two faces may be accessible through either of those two faces, while each of the other bins is accessible through an opening in one of the four faces. The mobile drive unit 320 may be configured to rotate the inventory holder 330 at appropriate times to present a particular face and the bins associated with that face to an operator or other components of the inventory system 310.

The inventory items may represent any objects suitable for storage, retrieval, and/or processing in an automated inventory system 310. For the purposes of this description, "inventory items" may represent any one or more objects of a particular type that are stored in the inventory system 310. Thus, a particular inventory holder 330 is currently "storing" a particular inventory item if the inventory holder 330 currently holds one or more units of that type. As one example, the inventory system 310 may represent a mail order warehouse facility, and inventory items may represent merchandise stored in the warehouse facility. During operation, the mobile drive units 320 may retrieve the inventory holders 330 containing one or more inventory items requested in an order to be packed for delivery to a customer or inventory holders 330 carrying pallets containing aggregated collections of inventory items for shipment. Moreover, in particular embodiments of inventory system 310, boxes containing completed orders may themselves represent inventory items.

In particular embodiments, the inventory system 310 may also include one or more inventory stations 350. The inventory stations 350 represent locations designated for the completion of particular tasks involving inventory items. Such tasks may include the removal of inventory items from the inventory holders 330, the introduction of inventory items into the inventory holders 330, the counting of inventory items in the inventory holders 330, the decomposition of inventory items (e.g., from pallet- or case-sized groups to individual inventory items), the consolidation of inventory items between the inventory holders 330, and/or the processing or handling of inventory items in any other suitable manner. In particular embodiments, the inventory stations 350 may just represent the physical locations where a particular task involving inventory items can be completed within the workspace 370. In alternative embodiments, the inventory stations 350 may represent both the physical location and also any appropriate equipment for processing or handling inventory items, such as scanners for monitoring the flow of inventory items in and out of the inventory system 310, communication interfaces for communicating with the central station 315, robot stations such as the robot stations 110 and 210 of FIGS. 1 and 2, and/or any other suitable components. The inventory stations 350 may be controlled, entirely or in part, by human operators or may be fully automated. Moreover, the human or automated operators of the inventory stations 350 may be capable of performing certain tasks to inventory items, such as packing, counting, or transferring inventory items, as part of the operation of the inventory system 310.

The workspace 370 may represent an area associated with the inventory system 310 in which the mobile drive units 320 can move and/or the inventory holders 330 may be stored. For example, the workspace 370 may represent all or part of the floor of a mail-order warehouse in which the inventory system 310 may operate. Although FIG. 3 shows, for the purposes of illustration, an embodiment of the inventory system 310 in which the workspace 370 includes a fixed, predetermined, and finite physical space, particular embodiments of the inventory system 310 may include the mobile drive units 320 and the inventory holders 330 that are configured to operate within a workspace 370 that is of variable dimensions and/or an arbitrary geometry. While FIG. 3 illustrates a particular embodiment of the inventory system 310 in which the workspace 370 is entirely enclosed in a building, alternative embodiments may utilize the workspaces 370 in which some or all of the workspace 370 is located outdoors, within a vehicle (such as a cargo ship), or otherwise unconstrained by any fixed structure.

In operation, the central station 315 may select appropriate components to complete particular tasks and transmit task assignments 318 to the selected components to trigger completion of the relevant tasks. Each task assignment 318 defines one or more tasks to be completed by a particular component. These tasks may relate to the retrieval, storage, replenishment, and counting of inventory items and/or the management of the mobile drive units 320, the inventory holders 330, the inventory stations 350 and other components of inventory system 310. Depending on the component and the task to be completed, a particular task assignment 318 may identify locations, components, and/or actions associated with the corresponding task and/or any other appropriate information to be used by the relevant component in completing the assigned task.

In particular embodiments, the central station 315 may generate the task assignments 318 based, in part, on inventory requests that the central station 315 receives from other components of the inventory system 310 and/or from external components in communication with the central station 315. These inventory requests identify particular operations to be completed involving inventory items stored or to be stored within the inventory system 310 and may represent communication of any suitable form. For example, in particular embodiments, an inventory request may represent a shipping order specifying particular inventory items that have been purchased by a customer and that are to be retrieved from the inventory system 310 for shipment to the customer. The central station 315 may also generate the task assignments 318 independently of such inventory requests, as part of the overall management and maintenance of the inventory system 310. For example, the central station 315 may generate the task assignments 318 in response to the occurrence of a particular event (e.g., in response to a mobile drive unit 320 requesting a space to park), according to a predetermined schedule (e.g., as part of a daily start-up routine), or at any appropriate time based on the configuration and characteristics of the inventory system 310. After generating one or more task assignments 318, the central station 315 may transmit the generated task assignments 318 to appropriate components for completion of the corresponding task. The relevant components may then execute their assigned tasks.

With respect to the mobile drive units 320 specifically, the central station 315 may, in particular embodiments, communicate the task assignments 318 to selected mobile drive units 320 that identify one or more destinations for the selected mobile drive units 320. The central station 315 may select a mobile drive unit 320 to assign the relevant task based on the location or state of the selected mobile drive unit 320, an indication that the selected mobile drive unit 320 has completed a previously-assigned task, a predetermined schedule, and/or any other suitable consideration. These destinations may be associated with an inventory request the central station 315 is executing or a management objective the central station 315 is attempting to fulfill. For example, the task assignment may define the location of an inventory holder 330 to be retrieved, an inventory station 350 to be visited, a storage location where the mobile drive unit 320 should park until receiving another task, or a location associated with any other task appropriate based on the configuration, characteristics, and/or state of the inventory system 310, as a whole, or individual components of the inventory system 310. For example, in particular embodiments, such decisions may be based on the popularity of particular inventory items, the staffing of a particular inventory station 350, the tasks currently assigned to a particular mobile drive unit 320, and/or any other appropriate considerations.

As part of completing these tasks, the mobile drive units 320 may dock with and transport the inventory holders 330 within the workspace 370. The mobile drive units 320 may dock with the inventory holders 330 by connecting to, lifting, and/or otherwise interacting with the inventory holders 330 in any other suitable manner so that, when docked, the mobile drive units 320 are coupled to and/or support the inventory holders 330 and can move the inventory holders 330 within the workspace 370. In particular embodiments, the mobile drive units 320 represent all or portions of the inventory holders 330. In such embodiments, the mobile drive units 320 may not dock with the inventory holders 330 before transporting the inventory holders 330 and/or the mobile drive units 320 may each remain continually docked with a particular inventory holder 330.

While the appropriate components of the inventory system 310 complete assigned tasks, the central station 315 may interact with the relevant components to ensure the efficient use of space, equipment, manpower, and other resources available to inventory system 310. As one specific example of such interaction, the central station 315 is responsible, in particular embodiments, for planning the paths mobile drive units 320 take when moving within the workspace 370 and for allocating use of a particular portion of the workspace 370 to a particular mobile drive unit 320 for purposes of completing an assigned task. In such embodiments, the mobile drive units 320 may, in response to being assigned a task, request a path to a particular destination associated with the task. Moreover, while the description below focuses on one or more embodiments in which the mobile drive unit 320 requests paths from the central station 315, the mobile drive unit 320 may, in alternative embodiments, generate its own paths.

Components of the inventory system 310 may provide information to the central station 315 regarding their current state, other components of the inventory system 310 with which they are interacting, and/or other conditions relevant to the operation of the inventory system 310. This may allow the central station 315 to utilize feedback from the relevant components to update algorithm parameters, adjust policies, or otherwise modify its decision-making to respond to changes in operating conditions or the occurrence of particular events.

In addition, while the central station 315 may be configured to manage various aspects of the operation of the components of the inventory system 310, in particular embodiments, the components themselves may also be responsible for decision-making relating to certain aspects of their operation, thereby reducing the processing load on the central station 315.

Thus, based on its knowledge of the location, current state, and/or other characteristics of the various components of the inventory system 310 and an awareness of all the tasks currently being completed, the central station 315 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of the inventory system 310 may be able to support a number of techniques for efficiently executing various aspects of the operation of the inventory system 310. As a result, particular embodiments of the central station 315 may, by implementing one or more techniques described herein, enhance the efficiency of the inventory system 310 and/or provide other operational benefits.

Figure 4:
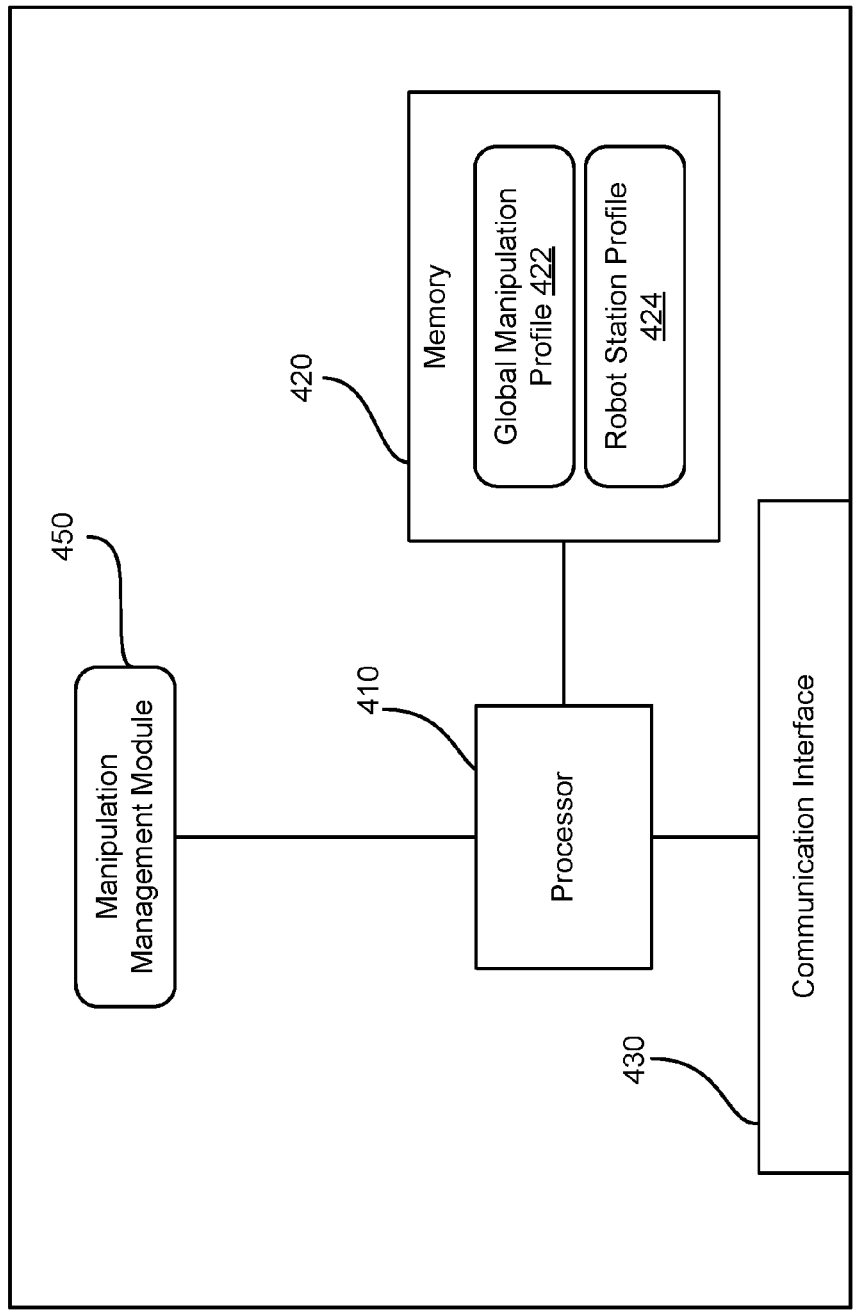
FIG. 4 illustrates in greater detail example components of a central station, according to a particular embodiment.

FIG. 4 illustrates in greater detail the components of a particular embodiment of a central station. In particular, the central station may include a processor 410, a memory 420, and a communication interface module 430. The processor 410, memory 420, and communication interface module 430 may represent a computer system. A similar computer system may also be used for a robot station. Further, the computer system may represent a single component, multiple components located at a central location within an inventory system, or multiple components distributed throughout the inventory system. In general, the computer system may include any appropriate combination of hardware and/or software suitable to provide the described functionality.

The processor 410 may be operable to execute instructions associated with the functionality provided by the central station. The processor 410 may comprise one or more general purpose computers, dedicated microprocessors, or other processing devices capable of communicating electronic information. Examples of the processor 410 include one or more application-specific integrated circuits (ASICs), field programmable gate arrays (FPGAs), digital signal processors (DSPs) and any other suitable specific or general purpose processors.

The memory 420 may store processor instructions, inventory requests, reservation information, state information for the various components of the inventory system and/or any other appropriate values, parameters, or information utilized by the central station during operation. For example, the memory 420 may store a global manipulation profile 422 and a robot station profile 424, along with an operation system. The memory 420 may represent any collection and arrangement of volatile or nonvolatile, local or remote devices suitable for storing data. Examples of the memory 420 include, but are not limited to, random access memory (RAM) devices, read only memory (ROM) devices, magnetic storage devices, optical storage devices or any other suitable data storage devices.

The communication interface module 430 may facilitate communication between the central station and other components of the inventory system, including manipulation data and profiles, reservation requests, reservation responses, route requests, route responses, and task assignments. These reservation requests, reservation responses, route requests, route responses, and task assignments may represent communication of any form appropriate based on the capabilities of the central station and may include any suitable information. Depending on the configuration of the central station, the communication interface module 430 may be responsible for facilitating either or both of wired and wireless communication between the central station and the various components of the inventory system. In particular embodiments, the central station may communicate using communication protocols such as 802.11, Bluetooth, or Infrared Data Association (IrDA) standards.

The central station may also host a manipulation management module 450, similar to the manipulation management modules 190 and 232 of FIGS. 1 and 2. The manipulation management module 450 may represent an application, implemented by hardware and/or software. For example, code of the manipulation management 450 may be available to the operating system of the memory 420 and executed by the processor 410.

Figure 5:
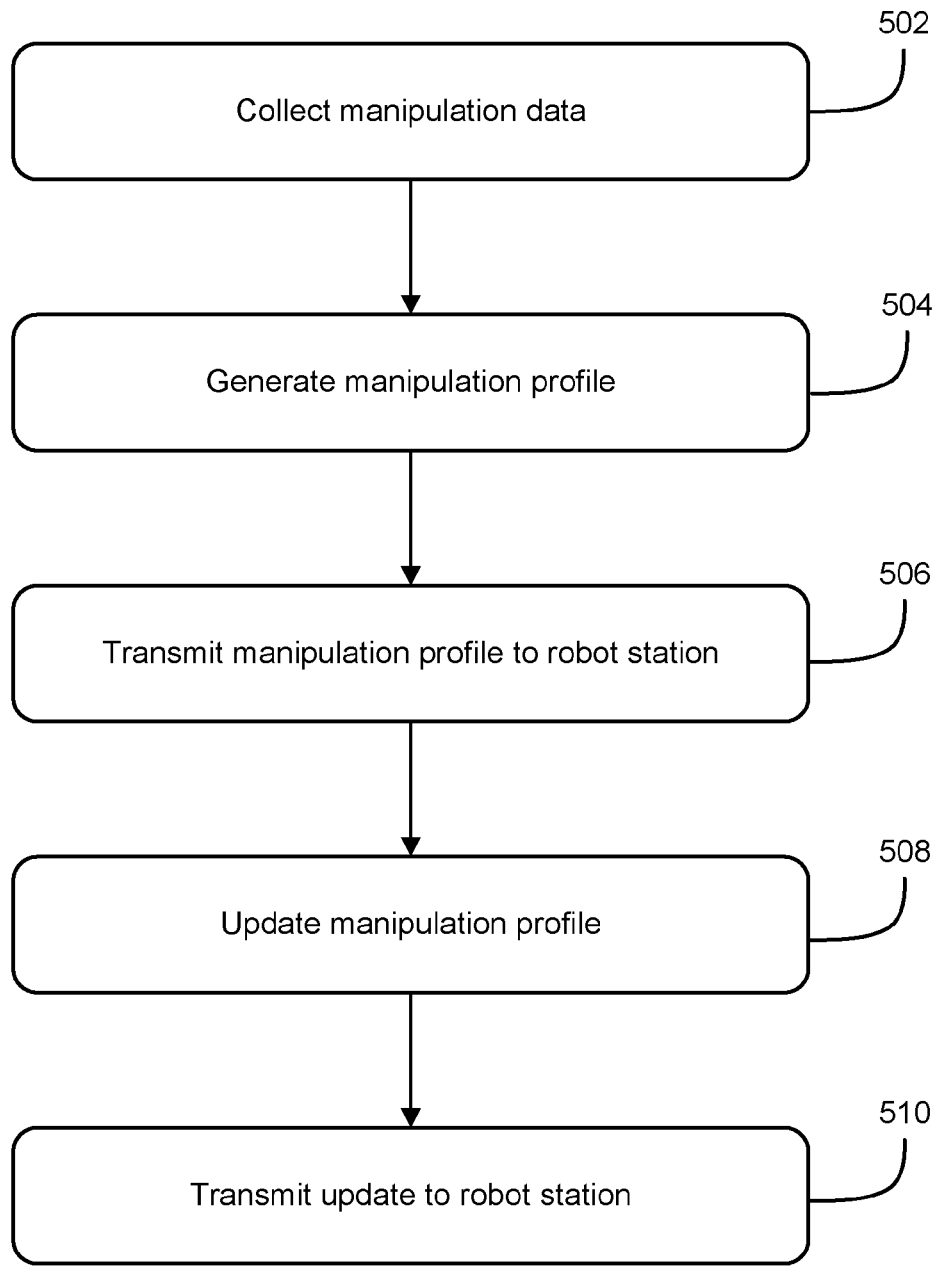
FIG. 5 illustrates an example flow for sharing data between robot stations, according to a particular embodiment.
Figure 6:
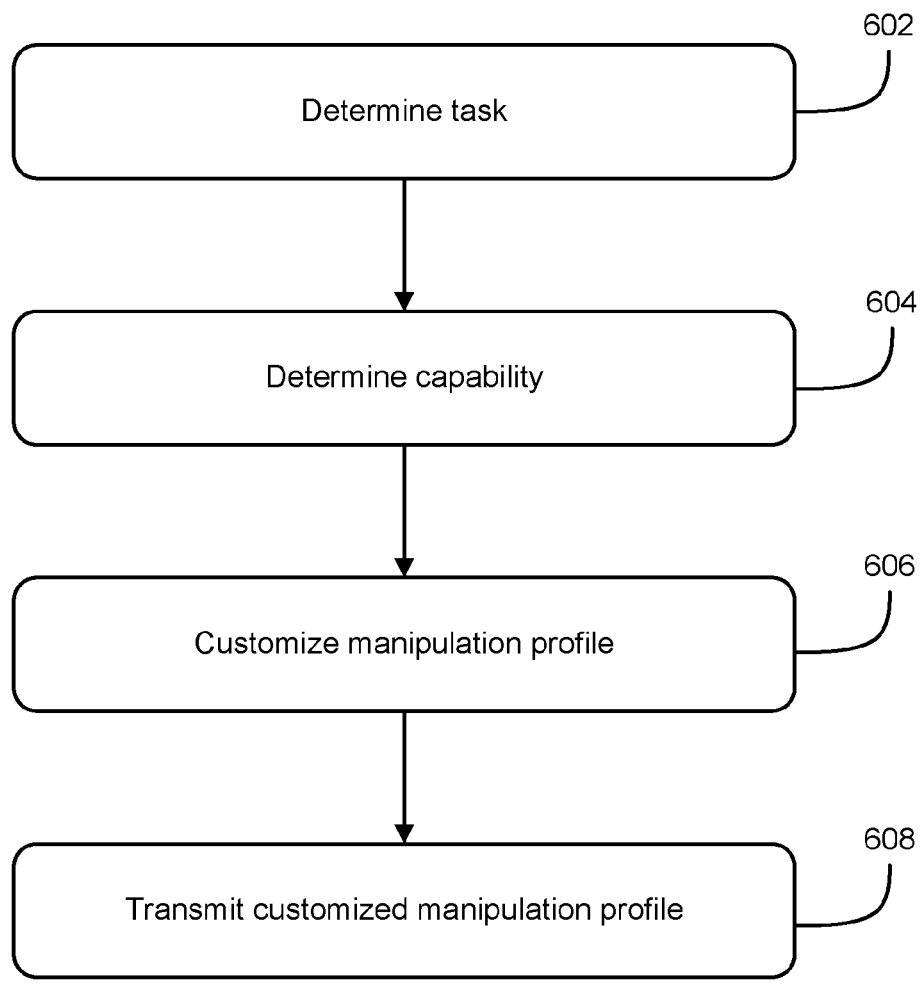
FIG. 6 illustrates an example flow for customizing a manipulation profile, according to a particular embodiment.
Figure 7:
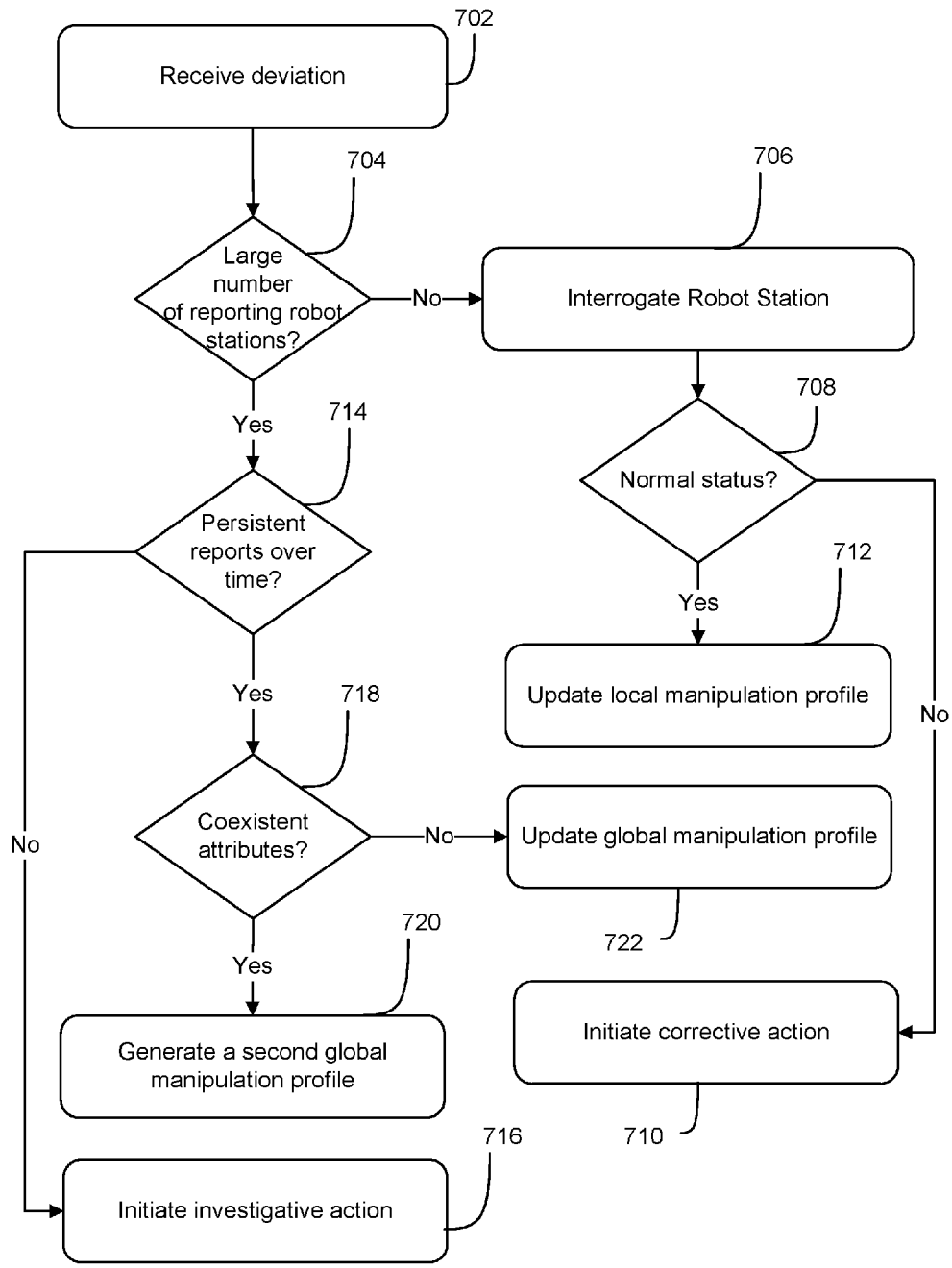
FIG. 7 illustrates an example flow for updating a manipulation profile, according to a particular embodiment.
Figure 8:
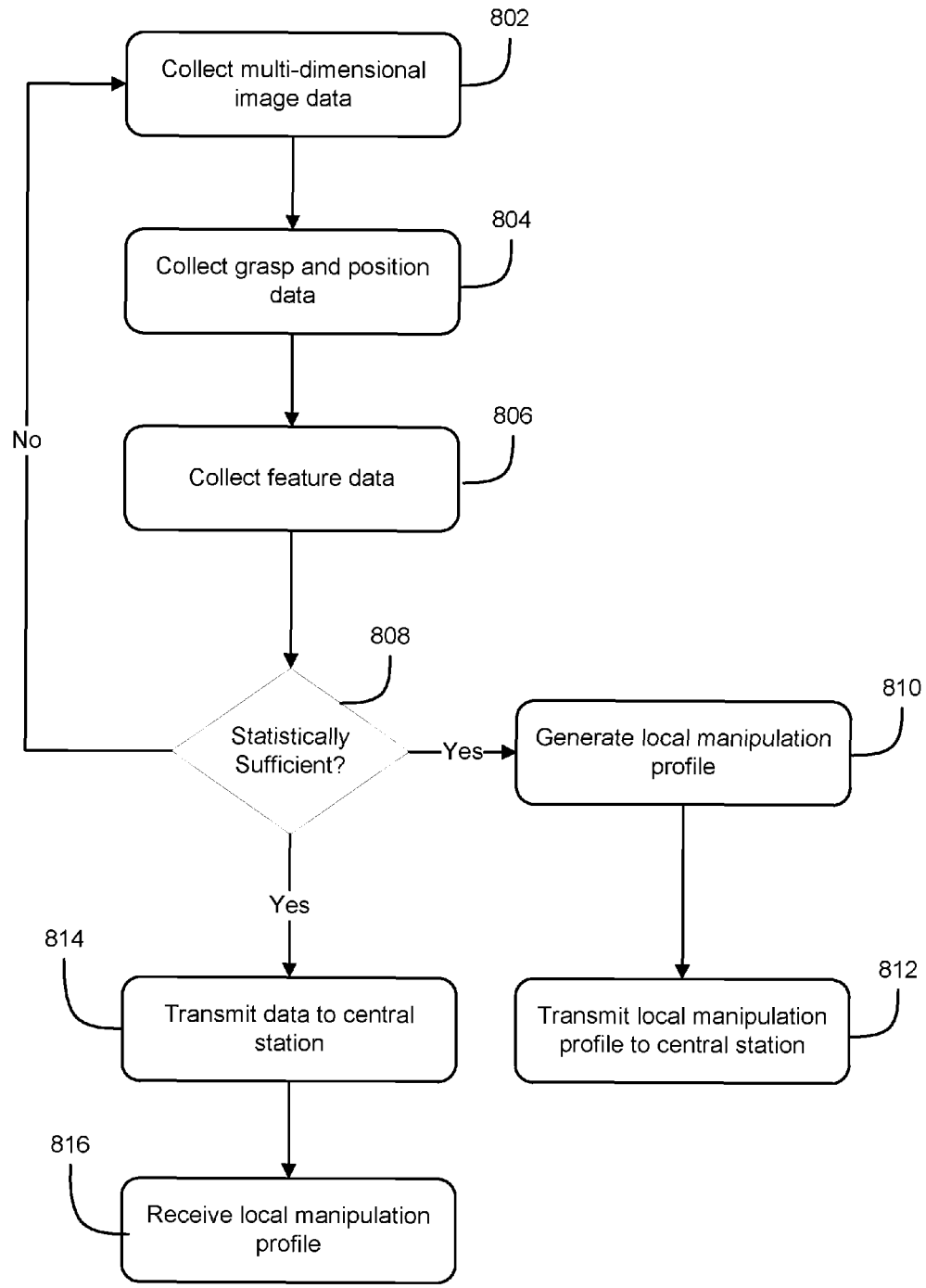
FIG. 8 illustrates an example flow for collecting data about manipulations, according to a particular embodiment.
Figure 9:
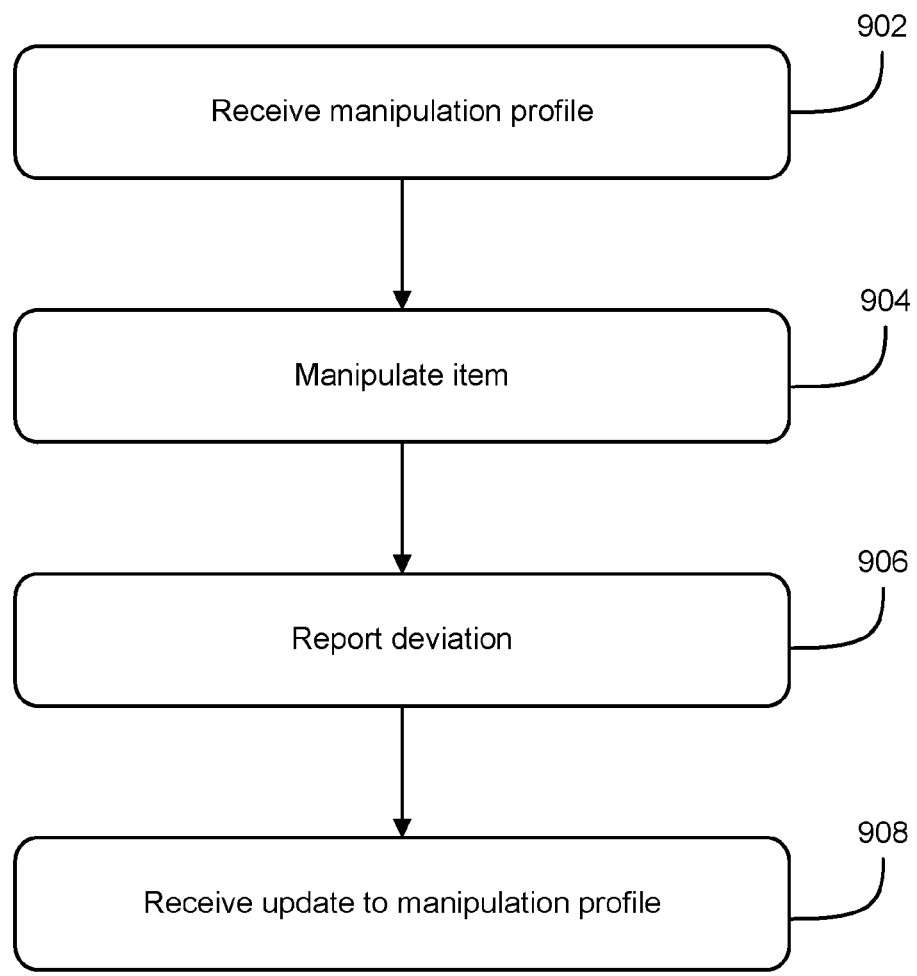
FIG. 9 illustrates an example flow for using a manipulation profile, according to a particular embodiment.
Figure 10:
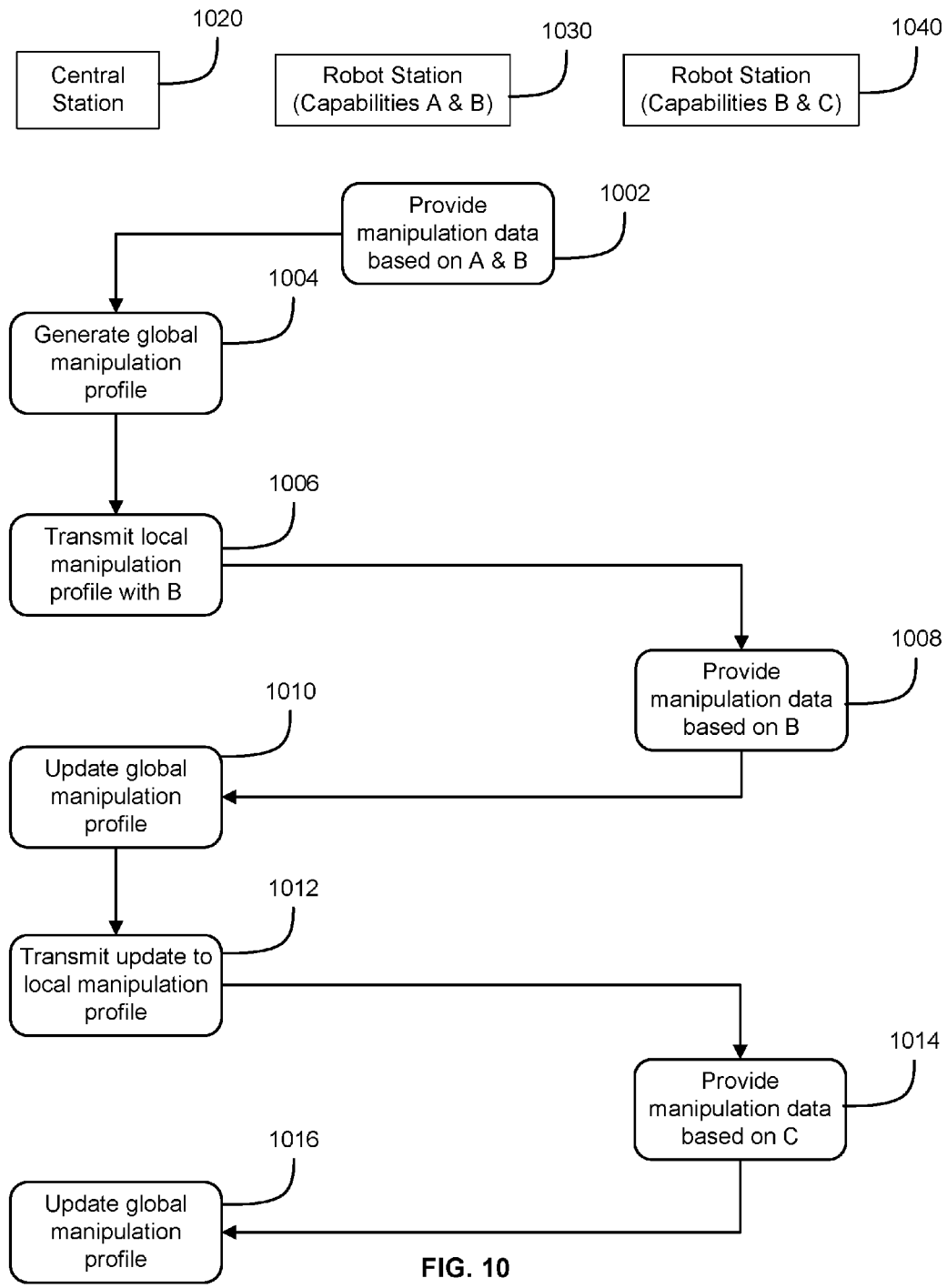
FIG. 10 illustrates in greater detail an example flow for sharing data between robot stations, according to a particular embodiment.

Turning to FIGS. 5-10, those figures illustrate example flows for manipulating an item. FIG. 5 illustrates an example high level flow for generating and using a manipulation profile to manipulate an item. FIG. 6 illustrates an example flow for transmitting a manipulation profile to a robot station. FIG. 7 illustrates an example flow for updating a manipulation profile over time. FIG. 8 illustrates an example flow for collecting manipulation data to generate a manipulation profile. FIG. 9 illustrates an example flow for reporting a deviation from a manipulation profile. FIG. 10 illustrates an example end-to-end flow for generating and using a manipulation profile to manipulate an item between two robot stations and a central station. Some of the operations of the example flows of FIGS. 5-10 may be similar. Such similarities are not repeated herein in the interest of clarity of explanation. In the interest of explanation, various illustrative examples may be described and may include a central station and two robot stations. However, the embodiments are not limited as such and may similarly apply to a larger number of central stations and/or robot stations.

Further, in the illustrative operations, some of the operations or functions may be embodied in, and fully or partially automated by, modules executed by one or more processors. In the interest of clarity of explanation, a central station and/or a robot station may be described as performing certain operations. This performance may nonetheless include a computer system of the central station and/or robot station to perform the operations. Other or a combination of other computer systems and modules may be additionally or alternatively used. Also, while the operations are illustrated in a particular order, it should be understood that no particular order is necessary and that one or more operations may be omitted, skipped, and/or reordered.

Turning to FIG. 5, the flow illustrates an example of generating and updating a manipulation profile by a central station for use by robot stations. The example flow may start at operation 502, where manipulation data may be collected. For example, the central station may receive the manipulation data from a set of robot stations. The manipulation data may be pulled or pushed over a network. In an example, the manipulation data may include data about how an item may have been manipulated at the robot stations. As such, the manipulation data may include data about the item, the different applied manipulations, the success and failure of the manipulations, and/or the used robotic arms and end effectors. For instance, the manipulation data may describe physical attributes of the item (e.g., weight, structural integrity, size, shape, dimension, etc.) and may describe features of the item including reliable and unreliable features (e.g., labels on a surface of the item). The manipulation data may also describe how the item may have been manipulated (e.g., the type, amount, locations, positions, duration of an applied force, pressure, voltage, current, etc.). The success and failure may list the result of an attempted manipulation such as whether the item may have been successfully manipulated, any damages to the item, slip outs, etc. The manipulation data may also identify a robotic arm and an end effector used in association with each manipulation.

In an example, a portion of the manipulation data may be generated by a robot station. In particular, a computer system of the robot station may operate a robotic arm, an end effector, and various sensors to generate the manipulation data. The raw manipulation data (e.g., images captured by imaging devices) may be transmitted to and collected by the central station. Alternatively or additionally, the robot station (e.g., its computer system) may process the data to generate a multi-dimensional manipulation model and a list of features and may transmit such data to the central station.

At operation 504, a manipulation profile may be generated. For example, the central station may analyze the collected manipulation data of the set of robot stations to generate the manipulation profile. The analysis may include applying a machine learning algorithm to the collected data. The manipulation profile may be generated for (e.g., be specific to) an item. However, for added efficiency, the manipulation profile may be generated for an item type instead. As such, the manipulation profile may be applicable to all items of that type. In this case, the analyzed manipulation data may be data about all or some of these items. Generally, the manipulation profile may identify the item type (or the item(s)), the applicable manipulations (e.g., grasp, move, etc.), and how each manipulation may be performed (e.g., what robotic arm and effector to use, what type and amount of force to apply, what position and orientation the item needs to be in, what surface of the item and type of surface contact need to be made, etc.).

In an example, a manipulation profile can include any information regarding the manner in which a robot station may attempt to manipulate a particular item or group of items. For example, a manipulation profile may include an indication of how the robotic arm is to approach the item to be manipulated, an indication of one or more end effectors to be utilized by the robotic arm, and/or an indication of a level of intensity (e.g., amount of force, pressure, voltage, current, etc.) with which the robotic arm is to operate the end effector(s). In some embodiments, the manipulation profile may also include a number of items to be simultaneously manipulated.

The approach identified in the manipulation profile may include a direction from which the robotic arm is to approach the item (e.g., from above, from a side, from an angle) and/or a sequence of motions by which the robotic arm is to perform a particular manipulating operation, which may include reaching the target item, grasping the target item, moving the target item to a target location, and/or releasing the target item in the target location.

As to end effectors identified in the manipulation profile, the robot station may include one or more end effectors and may be capable of utilizing multiple end effectors in conjunction with one another or as alternatives to one another. As illustrative examples, a manipulation profile may call for a number of different robotic arms each having different end effectors or combinations of end effectors, or a manipulation profile may involve activating a combination of end effectors available on a single robotic arm. Any suitable end effector (or number or combination of end effectors) may be utilized, including, but not limited to, soft robotic effectors, vacuum effectors, electro-adhesion effectors, and mechanical or electromechanical effectors.

The manipulation profile may also include an indication of a level of intensity with which the robotic arm is to operate a specific end effector. For example, for a mechanical or electromechanical pincher, a manipulation profile may include an amount of force (e.g., a fixed level or a varying profile) that the pincher is to exert during the manipulating operation. Intensity corollaries for other end effectors may include amount of suction for vacuum end effectors, strength of magnetic fields for magnetic or electromagnetic end effectors, current or charge exerted in an electro-adhesion end effector, or level of air pressure exerted to actuate a soft robotic end effector.

At operation 506, the manipulation profile may be transmitted to a set of robot stations over a network. In an example, the central station may transmit the same manipulation profile to the robot stations. In another example, the central station may customize the manipulation profile to a particular robot station and transmit the customized manipulation profile to that robot station. The customization may be based on, for example, a robot station profile stored and/or maintained by the central station for the particular robot station. The robot station profile may identify the robot station, its manipulation capabilities (e.g., what robotic arms and end effectors the robot station may support, etc.), the expected manipulations to perform, the expected tasks to complete, and/or the expected items to be manipulated. The central station may match elements of the robot station profile to elements of the manipulation profile and accordingly generate the customized manipulation profile.

At operation 508, the manipulation profile may be updated. In an example, the update may be over time (based on a time interval) or may be triggered by the amount of additional manipulation data that may have been collected. For instance, failures and successes of manipulations based on the manipulation profile may be sent to the central station. The failures may be used to update the manipulation profile. The successes may be used to add confidence to the manipulation profile. In another example, the update may be triggered by reports from the robot stations about deviations of properly manipulating items given the already transmitted manipulation profile. Accordingly, the central station may further analyze the additional manipulation data and/or reports to generate the updates.

At operation 510, the updates may be transmitted to the set of robot stations. In an example, the updated manipulation profile may be transmitted. In another example, only the updates to the manipulation profile may be transmitted. In yet another example, the updates may be transmitted to only the impacted robot stations. For instance, if an update changes a manipulation applicable to one robot station but not another one, the central station may transmit the update to the former but not to the latter robot station.

The manipulation profile maintained and stored by the central station may include a large amount of data. In comparison, a robot station may only use a portion of the manipulation profile, such as the portion describing manipulations that the robot station may support. Thus, to improve resource usage, a customized manipulation profile may be generated and transmitted to the robot station. In this case, the customized manipulation profile may represent a local manipulation profile for the robot station. As described in connection with operation 506, the customization may be based on a robot station profile stored and/or maintained by the central station for the particular robot station. FIG. 6 illustrates one example flow for customizing the manipulation profile according to the robot station profile.

The example flow may start at operation 602, where a task for a robot station may be determined. For example, the central station may determine the task based on management of the different tasks across an inventory system. The task may result in a change to the item or to a state of the item. For example, the task may be to move the item from point A to point B. To complete this task, different potential manipulations may exist. One set of potential manipulations may include grasping and moving the item in a particular way along a particular path. Another set of potential manipulations may include scooping and moving the item along a different path. However, performing one of the two sets may be more efficient (e.g., faster to perform, have a lower risk of damage to the item, etc.). Thus, determining what manipulations to apply to complete the task may be valuable.

At operation 604, a capability of the robot station may be determined. For example, the central station may look up, e.g., in a database having stored characteristics of robot stations, the profile of the robot station to determine the capability. At operation 606, a customized manipulation profile may be generated for the robot station based on the capability. If the capability indicates support for one type of manipulation (e.g., grasping but not scooping), the other type of manipulations may be eliminated. Otherwise, the central station may additionally access the manipulation profile to determine what manipulations to apply based on the capability (e.g., for grasping, the amount and location of force to apply; for scooping, the amount of friction and surface contact to apply). In either case, the central station may generate a customized profile by including in such a profile data about the manipulation(s) that the capability may support. Accordingly, the customized manipulation profile may include instructions about how the manipulation (s) may be performed given the capability of the robot station.

At operation 608, the customized manipulation profile may be transmitted to the robot station over a network. Because the instructions in the customized manipulation profile may have been generated based on collective knowledge from a plurality of robot stations, the customized manipulation profile may enable the robot station to efficiently perform the manipulations and complete the task.

Manipulation profiles transmitted to robot stations may be updated over time such that the robot stations may have access to the most up-to-date instructions about how to manipulate items. The central station may update a manipulation profile based on time interval, amount of collected manipulation data, or reports of deviations from the manipulation profile. FIG. 7 illustrates an example flow based on deviation reports.

The example flow may start at operation 702, where a deviation may be received. For example, the central station may receive a report of a deviation from a set of robot stations. The report may describe the deviation or may trigger the central station to interrogate (e.g., send a request to) the robot stations for additional data about the deviation. There may be different types of reported deviations. For example, a deviation may represent a change to an attribute of an item (or item type). In particular, the attribute of the item may have changed since a manipulation profile may have been generated, where the change may impact the success (or result in a failure) of a manipulation prescribed by the already existing manipulation profile. For instance, a weight of an item may have increased such that applying a particular suction force to pick up the item may no longer be possible, practical, or proper. In another example, a deviation may represent a change to a prescribed manipulation. For instance, the robot stations may report that grasping an item (or item type) in a particular way may not be successful contrary to what the manipulation profile specifies. Other types of deviations may also exist. In the interest of clarity of explanation, an example of an item deviation may be used to describe the remaining operations of FIG. 7. However, the flow may similarly apply to the other types of deviations.

At operation 704, a determination is made as to whether the number of reports about the deviation may be large. For example, the central station may compare the number of reports to a threshold. The threshold may be predefined (e.g., ten percent of the total number of robot stations). In an example, the threshold may also depend on the type or impact of the deviation. For instance, a deviation that may result in a damage to an item may be more relevant than a deviation that may not. Accordingly, the threshold for the former deviation may be lower than the threshold of the latter deviation such that a smaller number of reports may trigger the central station to investigate the cause of the former deviation and determine a solution.

If the number of reports is not large (e.g., does not exceed a threshold), the central station may determine that the deviation may be local to a subset of the robot stations. Accordingly, operation 706 may be performed to interrogate this subset of robot stations. Otherwise, the central station may determine that the deviation may be more global and may perform operation 714 to further investigate.

At operation 706, a robot station from the subset (or the entire subset) may be interrogated. For example, the central station may request the robot station to send operational information. The central station may accordingly determine an operational status of the robot station, such as whether a faulty component (e.g., a sensor, a power drive, etc.) may exist or an operational failure may have occurred.

At operation 708, the central station may determine the operational status of the robot station. For example, the central station may receive the operational information from the robot station in response to the request. If the operational status indicates an abnormal operation (e.g., a fault or a failure), the central station may determine that the deviation may have been caused by this abnormal operation. Accordingly, the central station may not update a manipulation profile local to the robot station. Instead, operation 710 may be followed. At operation 710, the central station may initiate a corrective action. For instance, a notification of the corrective action may be sent for display at a computing device of an operator. The corrective action may include troubleshooting the robot station to determine the cause of the abnormal operation. However, in the case where the operational status indicates a normal operation (e.g., no fault or failure), the central station may determine that deviation may be due to the item or the capability of the robot station. Accordingly, the central station may determine that an update to the local manipulation profile of the robot station may be desired to correct the deviation. At operation 712, the central station may update the local manipulation profile based on the deviation. For example, the central station may determine a change to the item attribute or a change to the robot station capability from the deviation report. The central station may then look up a global manipulation profile that may identify manipulations corresponding to the change and may update the local manipulation profile with these identified manipulations.

At operation 714, the central station may have determined that the deviation may be potentially global. Accordingly, the central station may further investigate the deviation to determine whether the global manipulation profile may be updated. For example, the central station may determine whether the deviation reports may be persistent over a time period. Similarly to the threshold, that time period may be predefined and may be adjusted based on the type and impact of the deviation (e.g., the larger the impact, the shorter the time period may be). If the reports are not persistent (e.g., disappear after some time), the central station may determine that the deviation was transient (e.g., deviating units of item may have been received by an inventory management system for only a short period of time). Accordingly, the central station may not update the global manipulation profile. Instead, operation 716 may be followed. At operation 716, the central station may initiate an investigative action. For instance, a notification of the investigative action may be sent for display at a computing device of an operator. The investigative action may include analyzing a history of received items, such as purchase orders and other available data about the items, to determine a cause of the transient deviation. However, in the case where the operational status indicates that the deviation persisted, the central station may confirm that the deviation should be further investigated. Accordingly, operation 718 may be followed.

At operation 718, the central station may determine whether a deviating attribute may exist with a non-deviating attribute. As described herein above, the deviation may be the result of a change to an attribute of an item. The changed attribute may represent a deviating attribute. Accordingly, the central station may determine whether some of the items being manipulated may exhibit the deviating attribute while some of the other items may exhibit the non-deviating attribute. The coexistence of the two attributes may indicate that over time, the robot stations may need to manipulate the items differently based on what attribute (the deviating or the non-deviating) may be exhibited. As such, the items should be re-categorized into two different groups (or item types), and respective manipulations may be specified for each of the groups. Accordingly, the central station may follow operation 720, by which a second global manipulation profile may be generated for the items exhibiting the deviating attribute, whereas the already existing global manipulation profile may remain applicable to the items exhibiting the non-deviating attribute. To generate the second global manipulation profile, the central station may collect and analyze manipulation data specific to the deviating items. However, if the two attributes do not coexist, that would means that the deviating attribute would have replaced the non-deviating attribute. As such, the items need not be re-categorized. Instead, the items may be assumed to no longer exhibit the non-deviating attribute but to, instead, be exhibiting the deviating attribute. Accordingly, the central station may follow operation 722, by which the existing global manipulation profile may be updated. The central station may collect and analyze additional manipulation data about the items to update the existing global manipulation profile.

Various types of manipulation data may be generated, collected, and analyzed to generate a manipulation profile. FIG. 8 illustrates an example flow that a robot station may implement to generate manipulation data. As illustrated, the manipulation data may include data associated with a multi-dimensional model, grasps and positions, and features of an item.

The example flow of FIG. 8 may start at operation 802, where a robot station may collect multi-dimensional image data. For example, the robot station may operate a robotic arm and an end effector to grab an item in a certain position and orientation. The robot station may also operate one or more 2D and/or 3D imaging devices to generate images of the item in the position and orientation. The robot station may repeatedly reposition and/or re-orient the item and generate additional images.

At operation 804, the central station may collect grasp and position data. For example, the robot station may operate the robotic arm and end effector to move along the edges and surfaces of the item and attempt various grasps operations along various positions on the item. The resulting data may represent grasp and position data.

At operation 806, the robot station may collect feature data. For example, the robot station may operate the robotic arm and the end effector to position the item in certain orientations and may activate a 2D imaging device to generate an image of the item. Image processing techniques may be applied to the image to recognize a feature on, for instance, a surface of the item.

At operation 808, a determination may be made as to whether statistically sufficient amounts of data may have been collected. Operation 808 may be performed after each of the operations 802-806. If the collected data (e.g., any of the multi-dimensional image data, grasp and position data, and feature data) is statistically insufficient, the corresponding operation (e.g., any of operations 802-806) may be repeated. Otherwise, the collected data may be further processed to generate a manipulation profile. As illustrated in FIG. 8, two or more potential processing types may be possible: one local to the robot station, one remote to the robot station, or various combinations thereof. The particular processing type to follow may depend on a balance between network bandwidth usage and computational processing.

At operation 810, the robot station may generate a local manipulation profile. For example, the robot station may generate a multi-dimensional manipulation model based on the three types of collected data. Based on the model, the robot stations may define instructions for manipulating an item. The instructions and the model may form a part of the local manipulation profile. At operation 812, the robot station may transmit the local manipulation profile to the central station over a network. In turn, the central station may use the local manipulation profile, or data thereof, to generate a global manipulation profile.

At operation 814, the robot station may transmit the collected data to the central station. In an example, the transmitted data may represent the raw, collected data (e.g., without any or with minimum processing of the collected data by the robot station). In another example, the robot station may have processed some, but not all of the collected data. For example, the transmitted data may include indications of successes and failures of certain grasps and positions.

At operation 816, the robot station may receive a local manipulation profile. For example, the central station may process the transmitted data, along with other manipulation data collected from other robot stations, to generate a global manipulation profile. The central station may customize the global manipulation profile for the robot station and transmit the customized manipulation profile to the robot station. This customized manipulation profile may represent the received local manipulation profile.

Once a robot station receives a manipulation profile from, for example, the central station, the robot station may use the manipulation profile to manipulate items. FIG. 9 illustrates an example flow to do so. The example flow of FIG. 9 may start at operation 902, where the robot station may receive the manipulation profile from the central station. The received manipulation profile may be customized for the robot station.

At operation 904, the robot station may manipulate an item based on the manipulation profile. For example, the robot station may operate a robot arm, an end effector, and/or a 2D or 3D imaging device or other sensors to identify the item. In an illustration, the robot station may generate 2D images of the item and apply image processing techniques to these images to recognize features of the item. The robot station may access (locally or remotely over a network) multiple lists of features and/or multi-dimensional models of items to find matches to the recognized features. The matches may then identify the item and the item type. The robot station may determine which manipulation profile may be used to manipulate the item based on matching the identity of the item (or item type) to one of its locally stored manipulation profiles. Accordingly, the robot station may retrieve manipulation instructions from the applicable manipulation profile and perform these instructions to manipulate the item.

At operation 906, the robot station may report a deviation associated with the applicable manipulation profile to the central station. In an example, the robot station may determine that a manipulation specified by the manipulation profile may not have been successful. In this example, the robot station may report the failure of the manipulation to the central station, along with additional contextual data associated with the manipulation and failure (e.g., what end effector was used, the type and amount of force applied, etc.). In another example, the robot station may detect a change to an attribute of the item that may impact the manipulation of the item. For instance, the weight of the item may have changed significantly (e.g., a ten percent increase). The robot station may operate various sensors to monitor certain item attributes (e.g., size, weight, shape, structure, etc.). A deviating attribute may be reported to the central station.

At operation 908, the robot station may receive an update to the manipulation profile. The update may be based on the reported deviation. For example, the update may change how the robot station may perform a particular manipulation. In another example, the update may include a new manipulation profile specific to a new type of item.

Turning to FIG. 10, the figure illustrates an example flow for using and maintaining a manipulation profile between a central station 1020, a first robot station 1030, and a second robot station 1040. The two robot stations 1030 and 1040 may be configured to perform the same, similar, or different tasks. As illustrated, the first robot station 1030 may support two capabilities (shown as "capabilities A and B") such as grasping and moving. In comparison, the second robot station 1040 may support common and different capabilities (shown as "capabilities B and C") such as moving and placing. As such, the manipulation data and the manipulation profile associated with each of the robot stations 1030 and 1040 may change based on these capabilities.

At operation 1002, the first robot station 1030 may provide manipulation data based on its capabilities to the central station 1020. For example, the manipulation data may include data about manipulating an item by using the two capabilities. At operation 1004, the central station 1020 may generate a global manipulation profile. For example, the central station 1020 may analyze the manipulation data provided from the first robot station 1030, optionally along with manipulation data provided from other robot stations such as the second robot station 1040, to generate the global manipulation profile. The global manipulation profile may include instructions about using capabilities A and B to manipulate items since the analyzed manipulation data may include data associated with these two capabilities.

At operation 1006, the central station 1020 may generate and transmit a local manipulation profile to the second robot station 1040. Since the second robot station 1040 may not support capability A but may support capability B, the central station 1020 may determine that the local manipulation profile need not include manipulation instructions associated with capability A. Instead, the central station may customize the global manipulation profile such that the local manipulation profile may include manipulation instructions associated with capability B.

At operation 1008, the second robot station 1040 may provide manipulation data based on capability B to the central station. For example, the second robot station 1040 may use the manipulation instructions associated with capability B to manipulate items. Some of the resulting manipulation data may be reported to the central station 1020. For instance, if a particular manipulation fails when success was expected, the failure may be reported. Similarly, success may also be reported.

At operation 1010, the central station 1020 may update the global manipulation profile based on the manipulation data provided from the second robot station 1040. For example, the central station 1020 may analyze such data to determine the changes to the global manipulation profile. For instance, a reported manipulation failure may be used to remove instructions about the corresponding manipulation from the global manipulation profile. Once updated, the update may be available for transmission to robot stations supporting capability B including, for example, the two robot stations 1030 and 1040.

At operation 1012, the central station 1020 may transmit an update associated with the local manipulation profile to the second robot station 1040. The update may change a portion of the local manipulation profile or may replace such profile altogether.

At operation 1014, the second robot station 1040 may provide manipulation data based on its capability C to the central station. For example, the second robot station 1040 may use the capability C to manipulate items and may report the resulting manipulation data.

At operation 1016, the central station 1020 may update the global manipulation profile based on the manipulation data associated with capability C. For example, the central station 1020 may analyze this manipulation data provided, optionally along with manipulation data provided from other robot stations, to generate an update to the global manipulation profile. The update may include instructions about using capability C to manipulate items. Once updated, the central station 1020 may transmit the update to robot stations supporting capability C including, for example, the second robot station 1040.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk ("DVD") or other optical storage, magnetic cassettes, magnetic tape, magnetic disk storage or other magnetic storage devices or any other medium which can be used to store the desired information and which can be accessed by a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory system, comprising:
   one or more processors; and
   one or more computer-readable media comprising computer-readable instructions that, upon execution by the one or more processors, cause the inventory system to at least:
      receive, from a first robotic manipulator, first data about performing an action by the first robotic manipulator, the action associated with manipulating an inventory item;
      generate a manipulation profile based at least in part on the first data, the manipulation profile comprising instructions about manipulating the inventory item by performing the action;
      transmit a portion of the manipulation profile to a second robotic manipulator based at least in part on the action being supported by the second robotic manipulator, the portion comprising the instructions;
      receive, from the second robotic manipulator, second data about performing the action by the second robotic manipulator, the second data comprising an indication of a failure of the second robotic manipulator to perform the action according to the instructions; and
      update the instructions in the manipulation profile based at least in part on the second data, the update comprising changing the instructions based at least in part on the failure.

2. The inventory system of claim 1, wherein the first robotic manipulator is configured to perform a different action that is associated with manipulating the inventory item and that is unsupported by the second robotic manipulator, and wherein the execution of the computer-readable instructions further cause the inventory system to at least:

receive, from the first robotic manipulator, additional data about performing the different action by the first robotic manipulator; and add, to the manipulation profile, additional instructions about performing the different action based at least in part on the additional data.

3. The inventory system of claim 2, wherein the portion of the manipulation profile transmitted to the second robotic manipulator excludes the additional instructions based at least in part on the different action being unsupported by the second robotic manipulator.

4. The inventory system of claim 1, wherein the second robotic manipulator is configured to perform a different action that is associated with manipulating the inventory item and that is unsupported by the first robotic manipulator, and wherein the execution of the computer-readable instructions further cause the inventory system to at least:

receive, from the second robotic manipulator, additional data about performing the different action by the second robotic manipulator; and add, to the manipulation profile, additional instructions about performing the different action based at least in part on the additional data.

5. The inventory system of claim 4, wherein the execution of the computer-readable instructions further cause the inventory system to at least:

transmit the instructions and the additional instructions of the manipulation profile to a third robotic manipulator based at least in part on a determination that the third robotic manipulator supports the action and the different action;

receive, from the third robotic manipulator, third data about performing the action and the different action by the third robotic manipulator; and further update the instructions in the manipulation profile based at least in part on the third data.

6. The inventory system of claim 4, wherein the execution of the computer-readable instructions further cause the inventory system to at least:

access a profile of the second robotic manipulator, the profile indicating that the second robotic manipulator supports the action and the different action; and select the portion of the manipulation profile based at least in part on the profile of the second robotic manipulator, the portion comprising the instructions and the additional instructions.

7. A computer-implemented method, comprising:

accessing, by a computer system, first manipulation data of a first robotic manipulator about a manipulation of an object type;

generating, by the computer system, instructions associated with manipulating the object type based at least in part on the first manipulation data;

transmitting, by the computer system, the instructions to a second robotic manipulator that supports the manipulation;

receiving, by the computer system from the second robotic manipulator, second manipulation data of the second robotic manipulator about the manipulation, the second manipulation data generated based at least in part on the instructions, the second manipulation data comprising an indication of a failure of the second robotic manipulator to perform the manipulation according to the instructions; and updating, by the computer system, the instructions based at least in part on the second manipulation data of the second robotic manipulator, the updating comprising changing the instructions based at least in part on the failure.

8. The computer-implemented method of claim 7, wherein updating the instructions comprises:

sending a request to the first robotic manipulator to confirm the failure of the manipulation at the first robotic manipulator; and changing the instructions based at least in part on a confirmation of the failure from the first robotic manipulator.

9. The computer-implemented method of claim 7, wherein generating the instructions comprises generating a manipulation profile, and wherein transmitting the instructions comprises:

selecting a portion of the manipulation profile based at least in part on a determination that the second robotic manipulator supports the manipulation, the portion comprising the instructions; and transmitting the portion of the manipulation profile to the second robotic manipulator.

10. The computer-implemented method of claim 9, wherein selecting the portion of the manipulation profile comprises:

determining, based at least in part on profiles of the first robotic manipulator and second robotic manipulator, that a different manipulation of the object type is supported by the first robotic manipulator and is unsupported by the second robotic manipulator; and excluding, from the portion of the manipulation profile, different instructions about the different manipulation, the different instructions being available from the manipulation profile based at least in part on different manipulation data of the first robotic manipulator about the different manipulation.

11. The computer-implemented method of claim 7, further comprising:

requesting, by the computer system from the second robotic manipulator, an indication of whether an attribute associated with the object type has changed, the attribute being common to objects of the object type and impacting the manipulation of the object type;

receiving, by the computer system from the second robotic manipulator based at least in part on the requesting, information that a first set of the objects comprises the attribute unchanged and that a second set of the objects comprises the attribute changed; and generating, by the computer system, second instructions associated with manipulating the second set of the objects based at least in part on a change to the attribute.

12. One or more non-transitory computer-readable storage media comprising computer-readable instructions that, upon execution by one or more processors, cause a system to perform operations comprising:

accessing first manipulation data of a first robotic manipulator about a manipulation of an object type, the manipulation of the object type associated with an attribute common to objects of the object type;

generating a profile associated with manipulating the object type based at least in part on the first manipulation data, a portion of the profile comprising instructions about the manipulation;

transmitting the portion of the profile to a second robotic manipulator based at least in part on the manipulation being supported by the second robotic manipulator;

receiving, from the second robotic manipulator, second manipulation data of the second robotic manipulator about the manipulation, the second manipulation data generated based at least in part on the portion of the profile;

updating the portion the profile based at least in part on the second manipulation data of the second robotic manipulator;

receiving, from the second robotic manipulator, information that a first set of the objects comprises the attribute unchanged and that a second set of the objects comprises the attribute changed; and generating a second profile associated with manipulating the second set of the objects based at least in part on a change to the attribute.

13. The one or more non-transitory computer-readable storage media of claim 12, wherein generating the profile comprises adding different instructions to the profile about a different manipulation of the object type, wherein the different manipulation is supported by the first robotic manipulator and is unsupported by the second robotic manipulator, and wherein the portion transmitted to the second robotic manipulator excludes the different instructions based at least in part on the different manipulation being unsupported by the second robotic manipulator.

14. The one or more non-transitory computer-readable storage media of claim 13, further comprising:

receiving, from the second robotic manipulator, additional manipulation data about an additional manipulation of the object type, wherein the additional manipulation is supported by the second robotic manipulator; and adding, to the profile, additional instructions about the additional manipulation based at least in part on the additional manipulation data.

15. The one or more non-transitory computer-readable storage media of claim 12, wherein receiving the second manipulation data comprises receiving an indication of a failure of the second robotic manipulator to perform the manipulation according to the portion of the profile, and wherein updating the instructions comprises changing the instructions based at least in part on the failure.

16. The one or more non-transitory computer-readable storage media of claim 15, wherein updating the instructions comprises:

sending a request to the first robotic manipulator to confirm the failure of the manipulation at the first robotic manipulator; and changing the instructions in the profile based at least in part on a confirmation of the failure from the first robotic manipulator.

17. The one or more non-transitory computer-readable storage media of claim 12, wherein transmitting the portion of the profile comprises:

selecting the instructions from the profile based at least in part on a determination that the second robotic manipulator supports the manipulation of the object type and based at least in part on an association between the instructions and the manipulation.

18. The one or more non-transitory computer-readable storage media of claim 17, wherein the determination that the second robotic manipulator supports the manipulation is based at least in part on a component of the second robotic manipulator, wherein the component is configured to manipulate objects of the object type and comprises at least one of a robotic arm or an end effector.

* * * * *